(12) United States Patent
Ejiri (10) Patent No.: US 6,335,804 B1
(45) Date of Patent: Jan. 1, 2002

(54) IMAGE COMMUNICATION APPARATUS

(75) Inventor: Seishi Ejiri, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/000,622

(22) Filed: Dec. 30, 1997

Related U.S. Application Data

(63) Continuation of application No. 08/233,721, filed on Apr. 26, 1994, now abandoned, which is a continuation of application No. 08/013,211, filed on Feb. 1, 1993, now abandoned, which is a continuation of application No. 07/831,634, filed on Feb. 10, 1992, now abandoned, which is a continuation of application No. 07/626,248, filed on Dec. 13, 1990, now abandoned, which is a continuation of application No. 07/282,684, filed on Dec. 12, 1988, now abandoned.

(30) Foreign Application Priority Data

Dec. 14, 1987 (JP) .................................................. 62-313976

(51) Int. Cl.⁷ ...................................................... H04N 1/40
(52) U.S. Cl. ........................... 358/444; 358/400; 358/468
(58) Field of Search ..................................... 358/400, 401, 358/403, 404, 437, 441, 443, 448, 449, 460, 468, 497, 498, 444

(56) References Cited

U.S. PATENT DOCUMENTS

| 4,511,928 A | 4/1985 | Colomb ......................... 358/474 |
| 4,695,898 A | 9/1987 | Ishikawa et al. .............. 358/449 |
| 4,704,636 A | 11/1987 | Yano .............................. 358/449 |
| 4,717,967 A | 1/1988 | Yoshida ........................ 358/448 |
| 4,789,900 A | 12/1988 | Takahashi ..................... 358/449 |
| 4,885,641 A | 12/1989 | Kato ............................. 358/451 |

*Primary Examiner*—Thomas D. Lee
(74) *Attorney, Agent, or Firm*—Fitzpatrick, Cella, Harper & Scinto (57) ABSTRACT

An image communication apparatus includes a receiving unit for receiving image data, an image memory for storing the received image data, a recorder for recording the received image data, and a control unit for causing the image memory to store the received image data and causing the recorder to record the received image data, and for, when recording by the recorder is disenabled, causing the image memory to continue storage of the received image data.

30 Claims, 8 Drawing Sheets

| RECEIVE No. | RECEIVED PAGE | INITIAL BLOCK | END BLOCK |
|---|---|---|---|
| 1 | 2 | 1 | 2 |
| 2 | 1 | 3 | 6 |
| 3 | 1 | 7 | 7 |

IMAGE COMMUNICATION APPARATUS

This application is a continuation of application Ser. No. 08/233,721, filed Apr. 26, 1994, now abandoned, which is a continuation of application Ser. No. 08/013,211, filed Feb. 1, 1993, now abandoned, which is a continuation of application Ser. No. 07/831,634, filed Feb. 10, 1992, now abandoned, which is a continuation of application Ser. No. 07/626,248, filed Dec. 13, 1990, now abandoned, which is a continuation of application Ser. No. 07/282,684, filed Dec. 12, 1988, now abandoned.

BACKGROUND OF THE INVENTION

1. Field of the Invention

The present invention relates to an image communication apparatus and, more particularly, to an image communication apparatus having an image memory for storing received image data, and a recorder for recording and outputting the received image data.

2. Related Background Art

In a conventional image communication apparatus such as a facsimile apparatus, since reception processing is interrupted when record paper sheets are used up, an error display is performed to interrupt an operation.

However, in an apparatus for performing automatic reception in an unmanned state during the nighttime, reception processing can no longer be performed once record paper sheets are used up.

As an apparatus for solving the above problem, a facsimile apparatus comprising an image memory is proposed. In an apparatus comprising an image memory of this type, so-called substitution reception processing for storing received image data in the image memory can be performed when record paper sheets are used up.

With the substitution reception, after the record paper sheets are used up, reception processing can be performed as long as a memory capacity allows.

As applications associated with memory substitution reception, there are known U.S. Pat. No. 4,717,967 and U.S. patent application Ser. No. 024,521 (filed on Mar. 11, 1987).

However, in the conventional substitution reception method using an image memory, if an end mark of a record paper sheet is detected during reception of a certain page, the recording page is recorded on a sheet, and data is stored in the memory from the next page.

With this method, there is no problem when an original image of a standard length is processed. However, when record paper sheets are used up during recording of an elongated original, a received image may be partially omitted.

In an apparatus for switching a receive recording mode on a record paper sheet to a memory substitution reception mode, data is stored in the memory from an indefinite page. For this reason, when the received data stored in the memory is printed out on record paper sheets later, it is cumbersome to find a correspondence between the previously receive-recorded originals and newly printed-out originals. More specifically, an operator must check the correspondence between the originals printed out from the memory and the previously printed-out originals.

SUMMARY OF THE INVENTION

It is an object of the present invention to eliminate the above-mentioned problems, and to improve an image communication apparatus.

It is another object of the present invention to provide an image communication apparatus which is free from loss of image data when a receive recording mode of image data is switched to a memory reception mode.

It is still another object of the present invention to provide an image communication apparatus in which, when a switching from a receive recording mode to a memory reception mode occurs during recording of image data, images of all the pages is recorded.

It is still another object of the present invention to provide an image communication apparatus which stores received image data in a memory and records it on a record paper sheet, and continues memory reception when a recording operation is disenabled.

It is still another object of the present invention to provide an image communication apparatus which executes memory reception parallel to recording of a received image, and when a recording operation is disenabled during image reception, continues memory reception so as to record an image of the entire page corresponding to a reception mode switching timing when image data stored in the memory is recorded later.

The above and other objects of the present invention will become apparent from the following detailed description of the embodiments.

DETAILED DESCRIPTION OF THE PREFERRED EMBODIMENTS

An embodiment of the present invention will be described with reference to the accompanying drawings.

Figure 1:
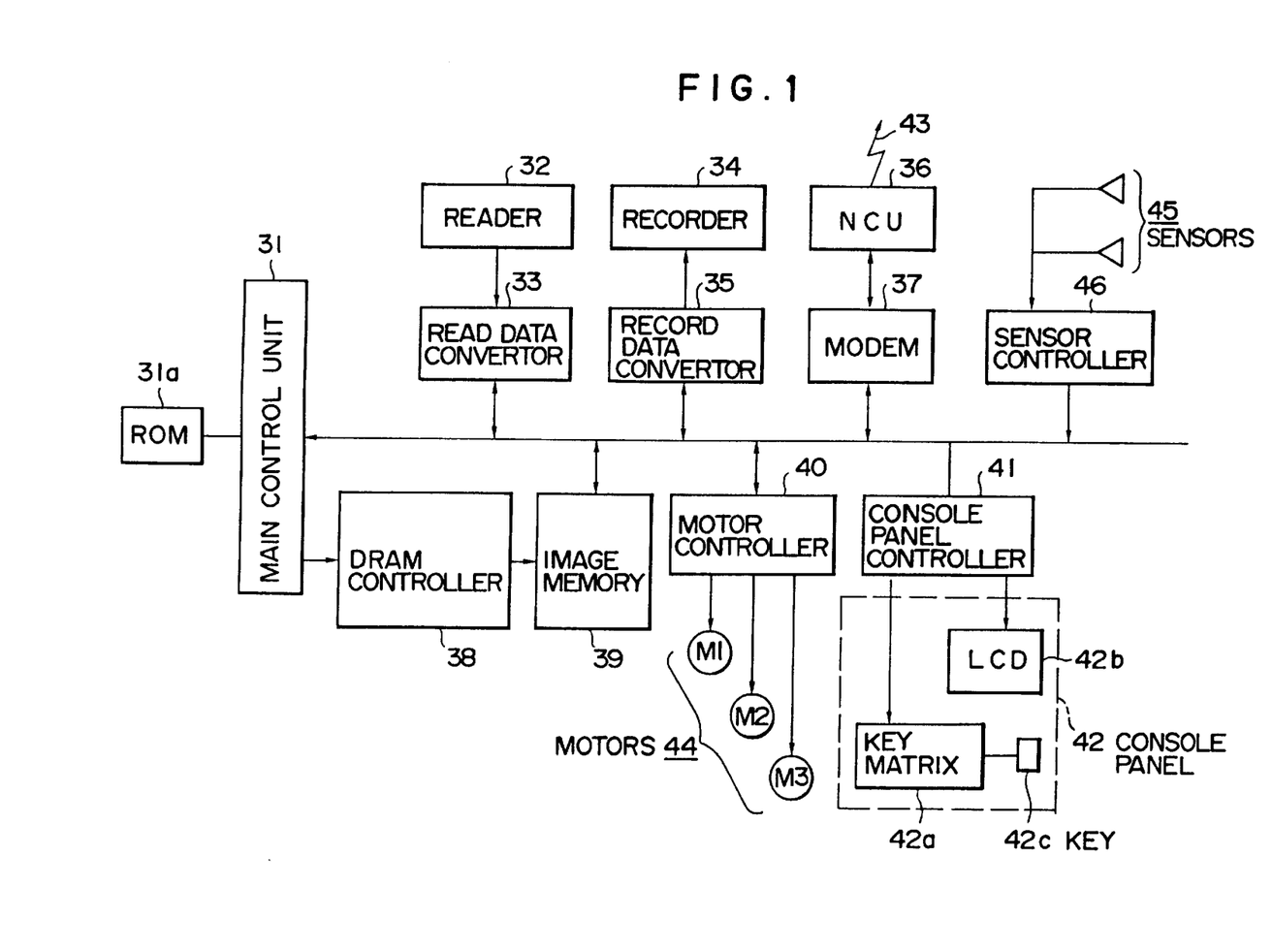
FIG. 1 is a block diagram showing an arrangement of a facsimile apparatus according to an embodiment of the present invention.

FIG. 1 shows an arrangement of a facsimile apparatus employing the present invention. As shown in FIG. 1, in this apparatus, a main control unit 31 comprising, e.g., a microprocessor controls respective units of the apparatus connected through data and address buses in accordance with a program (to be described later) stored in a ROM 31a. The respective units of the apparatus will be described below.

In FIG. 1, a reader 32 comprises a CCD line sensor, and an original feed system. The reader 32 reads an original image, and the read image is converted to binary data by a read data converter 33.

A received image or an image read by the reader 32 during a copying operation is recorded by a recorder 34 comprising, e.g., a thermal printer. Data conversion processing necessary for recording is performed by a record data converter 35.

An original and record paper in the reader 32 and the recorder 34 are fed by motors 44. The motors 44 include motors M1, M2, ..., provided to original and record paper feed systems.

Information associated with an operation state, e.g., the presence/absence of an original or record paper in the reader 32 or recorder 34 is detected by sensors 45. The sensors 45 are constituted by photosensors, and the like, and drive and detection processing of the sensors 45 is performed by a sensor controller 46. Only important ones of sensor positions will be described later.

A communication operation is controlled by a main control unit 31 in accordance with operation inputs at a console panel 42. The console panel is constituted by a key matrix 42a on a keyboard, and a liquid crystal display 42b.

The keyboard also includes a key 42c which is operated by an operator to interrupt processing when an emergency state occurs, as well as various normal control keys.

Data input/output operations with respect to the console panel are performed through a console panel controller 41 (comprising I/O ports and the like).

Image data transmission/reception operations with respect to a line 43 are performed through a modem 37 for modulating/demodulating an image signal and a procedure signal, and an NCU 36 for performing line connection control with a line control telephone or holding a loop.

Image data to be transmitted/received is stored in an image memory 39. The image memory 39 comprises, e.g., a dynamic RAM. Data input/output operations with respect to the image memory 39 are controlled through a DRAM controller 38.

Image data stored in the image memory 39 is coded by a compression coding method such as an MH or MR scheme.

Figure 2:
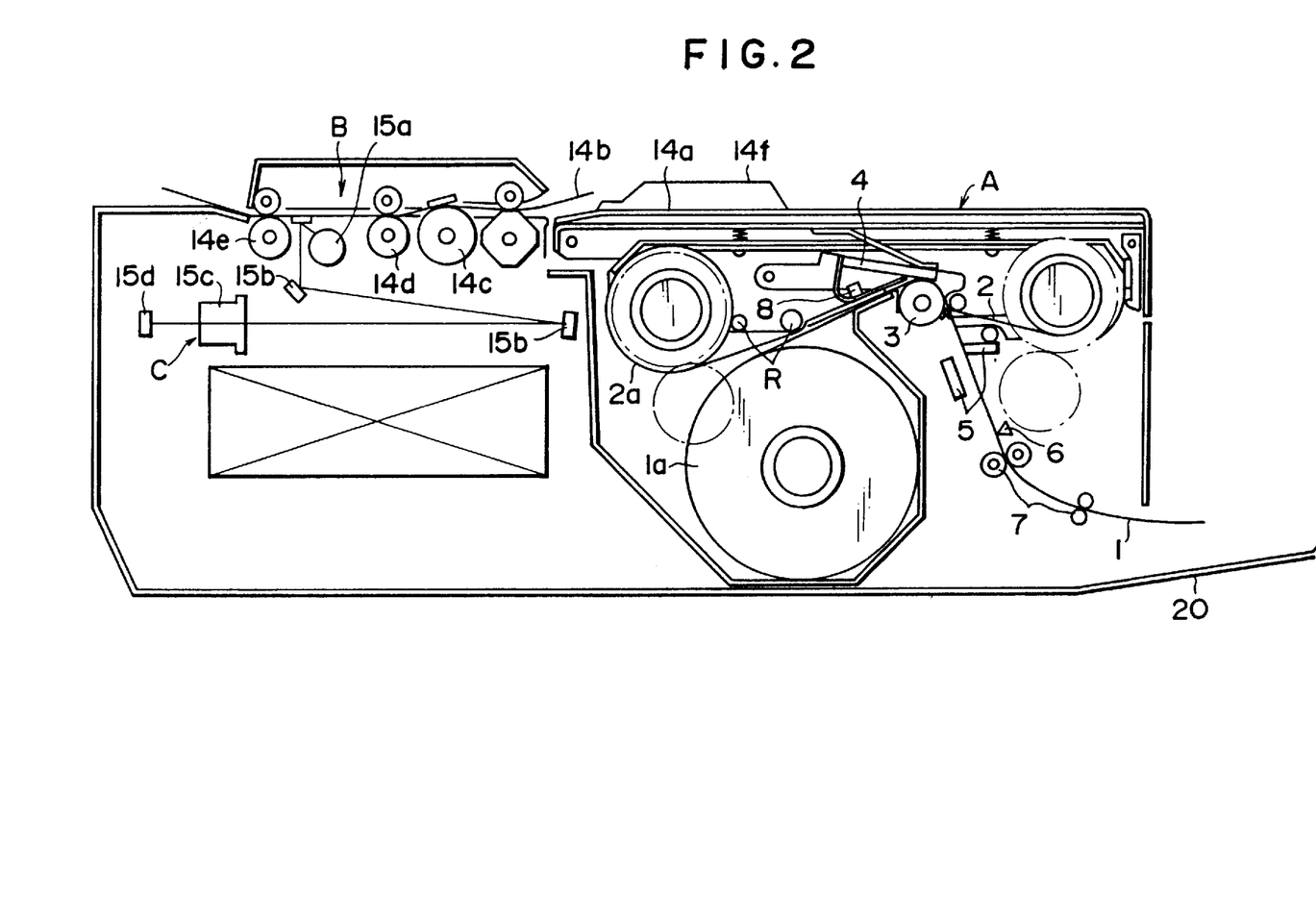
FIG. 2 is a sectional view showing a structure of a record/read system of the facsimile apparatus of this embodiment.

FIG. 2 shows a sectional structure of a record system and a read system of the facsimile system.

In FIG. 2, a record system A is constituted as follows.

FIG. 2 exemplifies a thermal transfer record system. Record paper 1 and a thermal transfer ink sheet 2 as a record material are wound in rolls 1a and 2a and are housed in the apparatus.

The record paper 1 and the thermal transfer ink sheet 2 are fed to the right in FIG. 2 by feed rollers R, and are brought into tight contact with a record head 4 comprising a thermal head by a pressing force of a platen roller 3, and are subjected to recording of image data which is received or read by the read system, by the record head 4.

In this case, a thermal transfer ink on the thermal transfer ink sheet 2 is melted by the record head 4, and is transferred onto the record paper 1.

Upon completion of recording, the record paper 1 is fed until a trailing end of the image reaches the position of a cutter 5, and is cut at that position.

The cut record paper sheet 1 is fed by a proper amount while being subjected to a feed amount check operation using a record medium sensor 6 (constituting the sensors 45), and is delivered onto a receiving member such as a stacker 20 outside the apparatus by feed rollers 7.

The record medium sensor 6 is used to detect whether or not an erroneous operation such as paper jam occurs in the feed system of the record paper 1.

The presence/absence of the record paper 1 at a position near the record head 4 is detected by a record medium sensor 8. An end mark is printed on a trailing end portion of the record paper 1, and is detected by the record medium sensor 8.

The record paper 1 left in the apparatus after cutting is rewound until its leading end portion reaches a position near the record head 4, thus preparing for the next recording operation.

An original feed system B and a read system C will be described below.

Originals 14b placed on an original table 14a on the upper surface of the apparatus are separated one by one by a separation roller 14c, and each original 14b is fed to the left in FIG. 2 at a constant speed and by a feed roller 14d and is delivered outside the apparatus by a delivery roller 14e.

Each original 14b is irradiated with light from a light source 15a of the original read system C midway along the feed path, and light reflected by the original 14b is focused on a read element 15d comprising a CCD sensor and the like through a plurality of mirrors 15b and lenses 15c. Thus, an original image is read by the read element 15d.

The basic portions of the record and read processing operations are controlled in accordance with a known control routine by the main control unit 31. A detailed description of the control procedure will be omitted herein.

The operation of the above arrangement will be described below. FIGS. 3A to 3F show the control procedure of the main control unit 31. The procedure shown in FIGS. 3A to 3F is stored in the ROM 31a. In FIGS. 3A to 3F, flows continue at positions denoted by the same numerals.

Figure 3A:
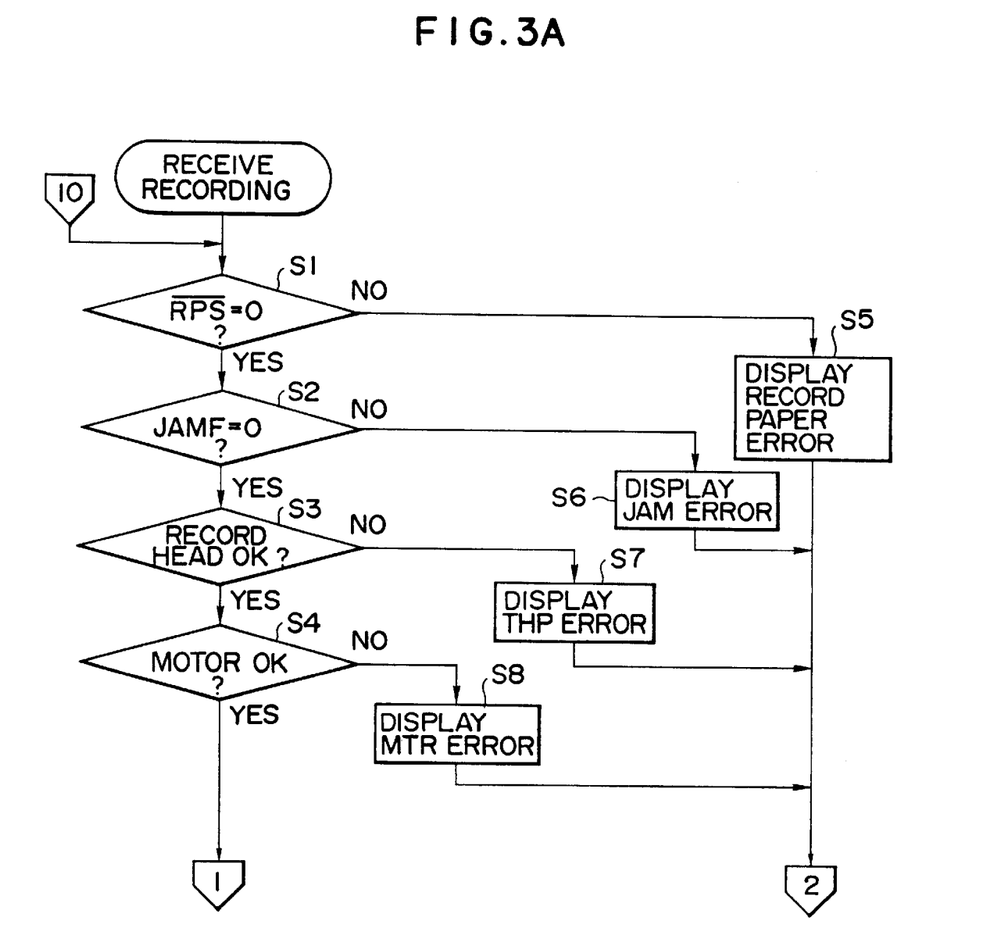
FIGS. 3A to 3F are flow charts showing a control procedure of a main control unit shown in FIG. 1.

FIG. 3A shows a routine for determining whether reception using normal record paper or substitution reception using the image memory 39 is performed.

In step S1 in FIG. 3A, a state of an output signal RPS from the record medium sensor 8 near the record head shown in FIG. 2 is checked. This signal is a negative logic signal, as indicated by a bar on the reference symbol in FIG. 3A, and when it is "0" (LOW level), indicates the presence of paper and when it is "1" (HIGH level), indicates the absence of paper. Therefore, if the presence of paper is detected, the flow advances to step S2; otherwise, the flow advances to step S5 to display a paper error. In this case, the liquid crystal display 42b of the console panel is used for the display.

In step S2, a flag JAMF indicating a jam of record paper is checked. According to the output from the record medium sensor 6 shown in FIG. 2, the flag JAMF is set to be "1" when a paper jam occurs; otherwise, it is set to be "0", as will be described later. Therefore, if a paper jam occurs, a jam error is displayed in step S6. If no paper jam is detected, the flow advances to step S3.

It is checked in step S3 if the record head 4 is not in an error state such as an overheat state and can perform recording. If NO in step S3, a THP error is displayed in step S7; otherwise, the flow advances to step S4.

In step S4, the state of the motors 44 of the feed system is similarly checked. If an error is detected, an MTR error is displayed in step S8; otherwise, the control enters a record paper reception routine in step S10 and thereafter shown in FIG. 3B. After error displays in steps S5 to S8, the control enters a substitution reception routine in step S34 and thereafter shown in FIG. 3F.

Figure 3B:
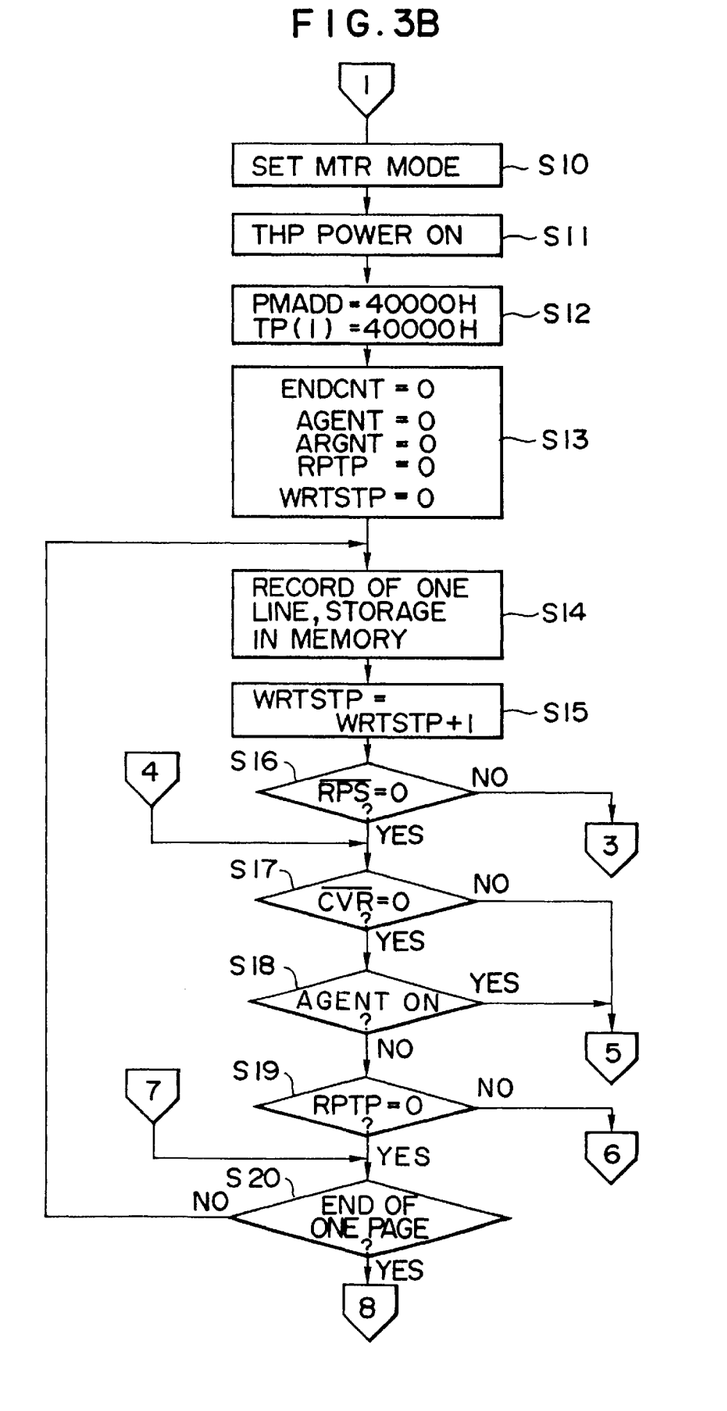

FIG. 3B shows only an automatic switching routine to a substitution reception mode of the known control routine of record paper reception processing. In step S10 in FIG. 3B, a feed amount of a record paper feed motor of the motors 44 is determined in accordance with a reception mode, since a scanning line density varies in accordance with a high-quality image mode and a normal reception mode.

In step S11, the record head 4 is powered. Thus, a record mechanism is prepared.

In step S12, a pointer (constituted by a register, a memory area, and the like) indicating a storage address of the image memory 39 is set to be an initial value, e.g., 40000H (H represents hexadecimal notation) to store image data in the image memory 39 parallel to recording. This address is not used for other memory transmission/reception operations, and is exclusively used for substitution reception.

Figure 4A:
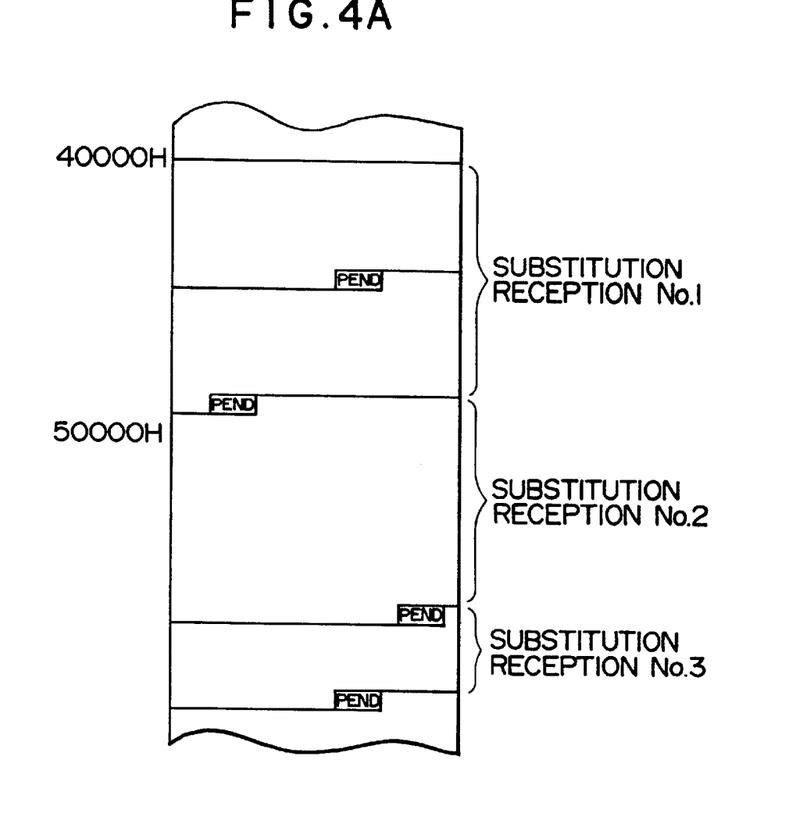
FIG. 4A is a view showing a data storage state in an image memory.

A data storage state of the image memory 39 is as shown in FIG. 4A. FIG. 4A shows a state after communication is performed three times in accordance with a procedure (to be described later). As shown in FIG. 4A, image data is stored from address "40000H" of the image memory 39 in the first communication. Data up to the third communication are successively stored in the image memory 39. In FIG. 4A, symbol PEND is a special symbol indicating an end of image data of one page in each communication.

In step S13, flags and counters for automatically switching to a substitution reception mode, indicated by symbols ENDCNT, AGENT, RPTP, WRTSTP, and the like are reset to "0".

A counter ENDCNT is used for counting the number of lines required until recording of a page is completed. The counter is automatically operated in accordance with the progress of recording processing during recording. A counter AGENT counts the number of communications (communications with a given party on the other end of a line) in the substitution reception mode. A flag RPTR indicates if the reading end of the record paper is detected by the record medium sensor 6. A flag ARCNT is set (1: upon depression, 0; standby state) upon depression of the key 42c of the keyboard, which is depressed by an operator to perform urgent interruption. A counter WRTSTP counts the number of recorded lines.

In step S14, received 1-line image data is recorded by the record head 4, and is sequentially stored at an address of the image memory 39 indicated by a pointer PMADD. Each time image data is stored, the value of the pointer PMADD is incremented.

In step S15, the record line counter WRTSTP is incremented.

In steps S16 to S20, the following conditions are discriminated.

It is checked in step S16 if the output RPS from the record medium sensor 8 is "0", i.e., the record paper 1 is present near the record head 4. If YES in step S16, the flow advances to step S17; otherwise, the flow advances to step S21 shown in FIG. 3C.

It is checked in step S17 if a sensor (not shown) for detecting an open/closed state of a recorder cover 14f detects a cover closed state (output CVR=0). If YES in step S17, the flow advances to step S18; otherwise, the flow advances to step S23 in FIG. 3C.

It is checked in step S18 if the flag AGENT which is set in response to an urgent interruption by an operator using a key 42d of the keyboard is ON (1). If YES in step S18, the flow advances to step S23 shown in FIG. 3C; otherwise, the flow advances to step S19.

It is checked in step S19 if the flag RPTP is "0", i.e., if the record medium sensor 6 detects the leading end of the record paper. If NO in step S19, the flow advances to step S20; otherwise, the flow advances to step S26 shown in FIG. 3D.

It is checked in step S20 if image data processing for one page is ended. If NO in step S20, the flow returns to step S14 to repeat the above routine; otherwise, the flow advances to step S30 shown in FIG. 3E.

Figure 3C:
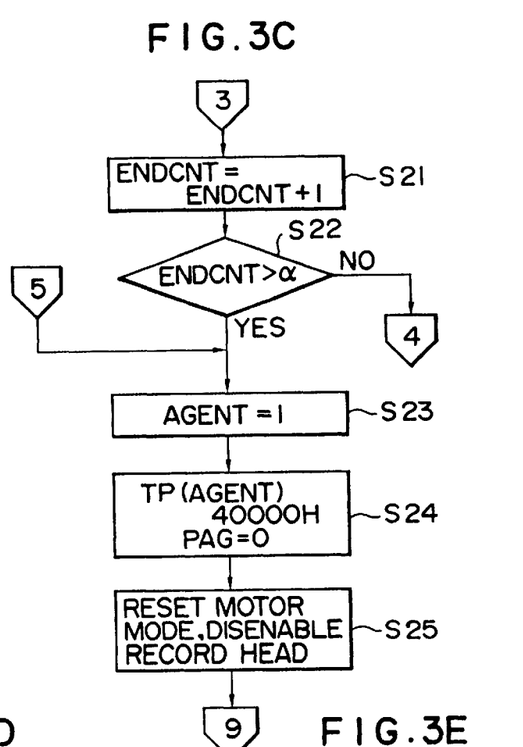

FIG. 3C shows processing executed when a branch from steps S1 to S4 shown in FIG. 3A or from steps 16 to S29 shown in FIG. 3B occurs, i.e., when a condition for interrupting the record paper reception is established.

If the end mark of the record paper 1 is detected by the record medium sensor 8 in step S16 in FIG. 3B, the counter ENDCNT for counting the number of processing lines after end mark detection of the record paper is incremented by one in step S21 in FIG. 3C.

It is checked in step S22 if the value of the counter ENDCNT is larger than a predetermined value $\alpha$. The value a is $\alpha$ value obtained by converting a length from the leading end of the end mark of the record paper 1 to the trailing end of the record paper in units of recording line counts, and changes depending on the reception mode.

Step S22 is executed to determine whether or not the following image data can be recorded. When YES is obtained in step S22, all the data of that page cannot be recorded if the recording operation is continued. Therefore, the flow advances to step S23. If NO in step S22, since the data of at least this page can be recorded, the flow returns to step S17 in FIG. 3B, and recording and data storage in the image memory 39 are continued.

In step S23, the counter AGENT for counting the number of times of substitution reception is incremented.

Figure 4B:
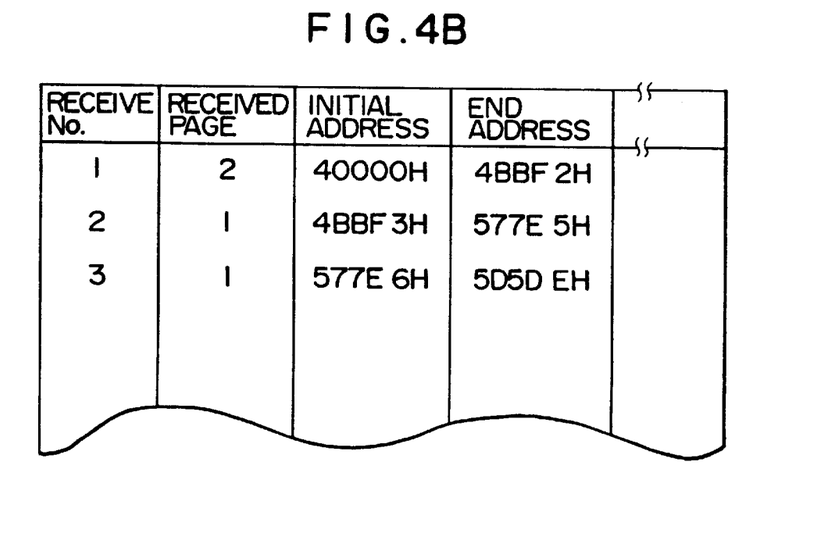
FIG. 4B is a view showing a management table of the image memory.

An address table shown in FIG. 4B is stored in a portion of a memory area of the main control unit 31. The table consists of a substitution reception number (corresponding to the value of the counter AGENT), a page count, and image data storage initial and end addresses.

In step S24, the image data storage initial address of substitution reception in the table is set to be "40000H". This data storage is given by equation TP(AGENT)=40000H in FIG. 3C. In step S24, a counter PAG for counting the number of pages of substitution reception is reset.

Figure 3D:
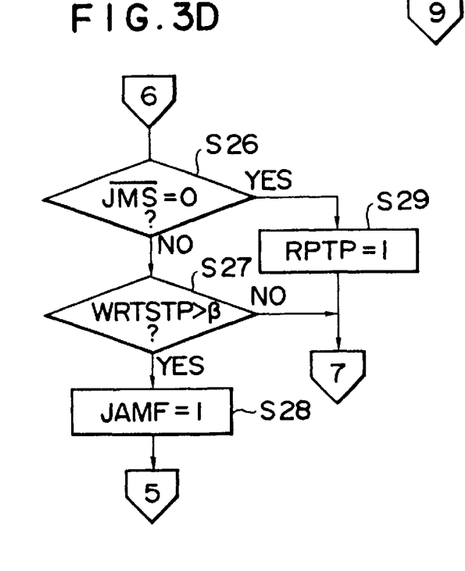
Figure 3E:
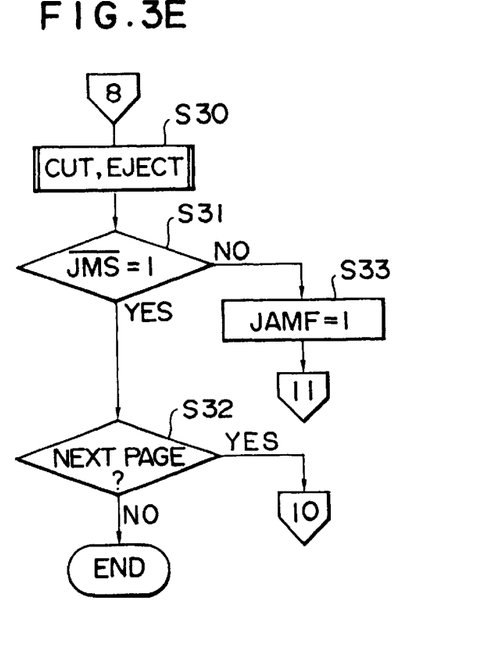
Figure 3F:
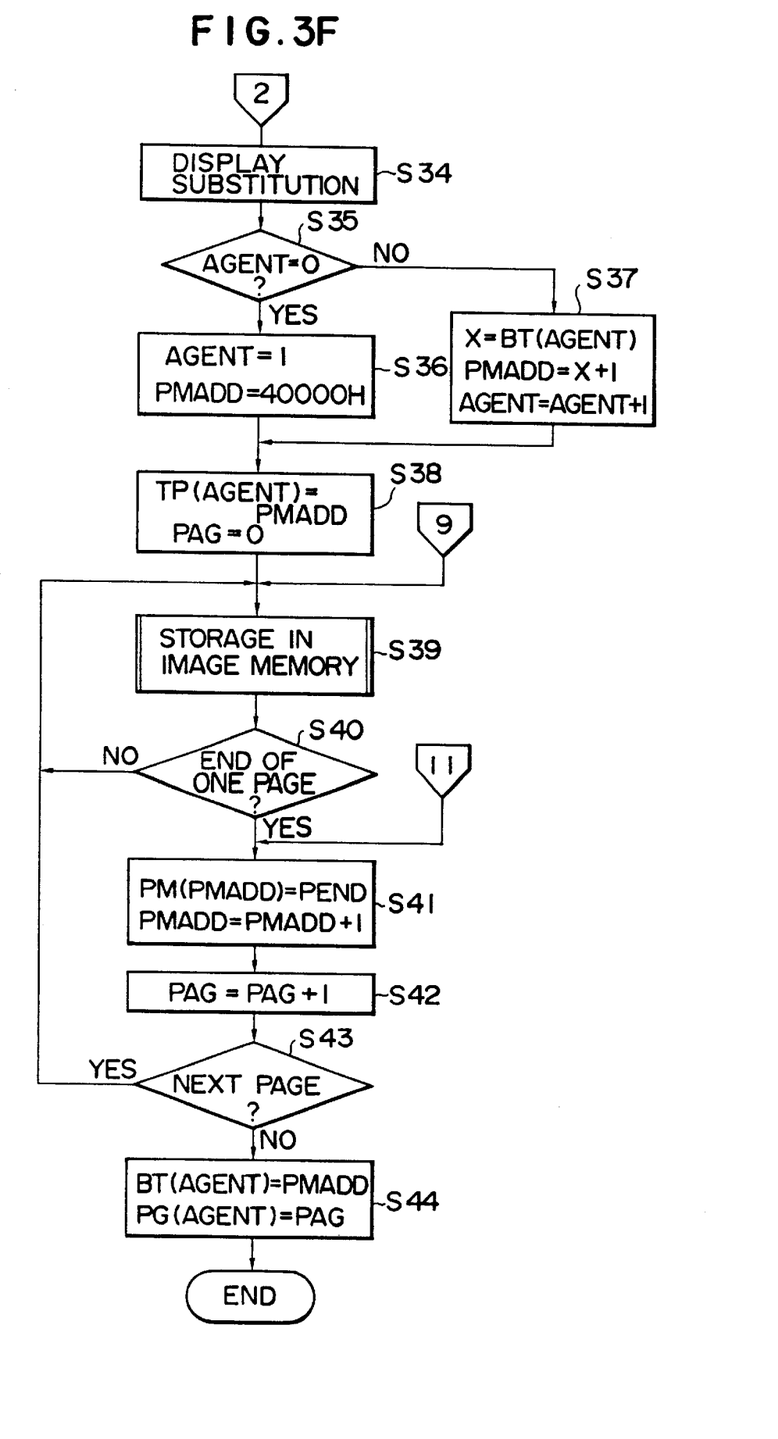

In step S25, the motors 44 and the record head 4 of the recorder 32 are disenabled to interrupt the recording operation, and the flow then advances to step 39 shown in FIG. 3F.

FIG. 3D shows processing executed when a paper jam is detected in step S19 in FIG. 3B.

In step S26 in FIG. 3D, it is checked if the flag JMS is "0". This flag indicates whether or not record paper is present at the position of the record medium sensor 6 (0; presence, 1; absence). If NO in step S26, the flow advances to step S27; otherwise, the flow advances to step S29.

When NO is obtained in step S26, it is checked in step S27 if the counter WRTSTP for counting the number of recorded lines is larger than a predetermined value $\beta$. The value $\beta$ represents a distance from the record position of the record head 4 to the sensor 6 in units of line counts, and changes depending on the reception mode in the same manner as in the value $\alpha$ described above. If YES in step S27, the flow advances to step S28; otherwise, the flow returns to step S20 shown in FIG. 3B.

Since no record paper can be detected by the record medium sensor 6 after the record paper is fed by the distance 62 or longer in the routine shown in FIG. 3B, the jam flag JAMF is set in step S28, and the flow advances to step S23 shown in FIG. 3C.

In step S29, the flag RPTP is set to a state (1) for canceling the jam mode, and the flow returns to step S20 in FIG. 3B.

FIG. 3E shows a routine executed when YES is obtained in step S20 in FIG. 3B, that is, when one-page recording processing is normally ended.

In step S30 in FIG. 3E, the record system A shown in FIG. 2 is driven for a predetermined period of time by the known control procedure, so that the recorded paper is cut and delivered, and the remaining paper is rewound.

In step S31, the flag JMS representing the detection state of the record medium sensor 6 is checked to determine whether or not the record paper 1 is present at the position of the record medium sensor 6. If YES in step S31, the flow advances to step S32; otherwise, the flow advances to step S33.

In step S32, it is checked if there is information of the next page to be recorded. If YES in step S32, the flow returns to step S1 in FIG. 3A; otherwise, the processing is ended.

It is determined in step S33 that a paper jam has occurred since the leading end of the record paper cannot be detected after the record paper is rewound for a predetermined period of time, and the jam flag JAMF is set. The flow then advances to step S41 in FIG. 3F.

FIG. 3F shows a substitution reception routine started upon a paper jam during recording, the absence of record paper, an open state of the recorder cover, or urgent interruption by the key 42d. When the control enters the substitution reception routine from the routine shown in FIG. 3A, step S34 is executed first.

In step S34 in FIG. 3F, a message indicating that substitution reception is performed is displayed using the liquid crystal display 42b of the console panel 42.

It is checked in step S35 if the substitution reception counter AGENT is "0". If YES in step S35, the flow advances to step S36; otherwise, the flow advances to step S37.

In step S36, the counter AGENT is set to be "1", and the memory storage pointer PMADD is set to be "40000H".

Since substitution reception has already been performed several times, the memory storage initial address is calculated in step S37. First, an image data storage end address X of substitution reception indicated by the counter AGENT is calculated. Equation X=BT(AGENT) in FIG. 3F represents address arithmetic processing using the table shown in FIG. 4B.

In step S37, "1" is added to the value X obtained by the above arithmetic operation in order to obtain the following image data storage initial address, and the sum is set as to the storage pointer PMADD. The counter AGENT is incremented.

After step S36 or S37, the value of the pointer PMADD is stored in an initial address area indicated by the counter AGENT of the table shown in FIG. 4B, in step S38. Equation TP(AGENT)=PMADD represents address data storage. In step S38, the page counter PAG is reset.

In step S39, image data is stored in the image memory 39 line by line. In this case, the pointer PMADD is also appropriately incremented. When the control enters from the routine shown in FIG. 3C in the substitution reception routine, processing starts from step S39. More specifically, following image data is stored to follow data which have already been stored simultaneously with recording.

It is checked in step S40 if storage of one-page data is ended. If YES in step S40, the flow advances to step S41; otherwise, the flow returns to step S39, and the received data is sequentially stored in the image memory 39.

In step S41, a page end code PEND is stored at an address indicated by the pointer PMADD. Equation PM(PMADD)= PEND in FIG. 3F represents this storage processing. Thereafter, the pointer PMADD is incremented. When the control enters from the paper jam detection routine shown in FIG. 3E in the substitution reception routine, processing starts from step S41.

In step S42, the page counter PAG is incremented, and the flow advances to step S43.

It is checked in step S43 if the next page is received. If YES in step S43, the flow returns to step S39, and the above processing is repeated. If NO in step S43, the flow advances to step S44.

In step S43, the value of the pointer PMADD is stored in an end address area for the corresponding communication of the table shown in FIG. 4B so as to prepare for the next substitution reception operation (equation BT(AGENT)= PMADD). The count value of the page counter PAG is stored in a page count area for the corresponding communication of the table (equation PG(AGENT)=PAG).

With the above arrangement, the control enters image data substitution reception processing under the condition wherein a paper jam during recording, the absence of record paper, an open state of the recorder cover, or urgent interruption by the key 42d occurs.

When the above condition is established during recording, the substitution reception is immediately started. If the record paper is used up in the middle of a page, it is checked if the page in processing can be recorded to the end. Only when the recording is disenabled, the control immediately enters the substitution reception routine. Therefore, an image of one page can be prevented from being interrupted.

Even when the control enters the substitution reception routine before completing recording of a page, the received data is stored in the image memory 39 simultaneously with recording from the beginning of the communication. Therefore, the stored data can be read out from the image memory 30 from the beginning to be recorded, so that complete page data can be reproduced without including a cut portion of the record paper.

When the recorder cover is opened or an urgent interruption occurs by a key input, since the substitution reception processing is forcibly and immediately started, received data can be surely acquired without any loss of received data.

Figure 5A:
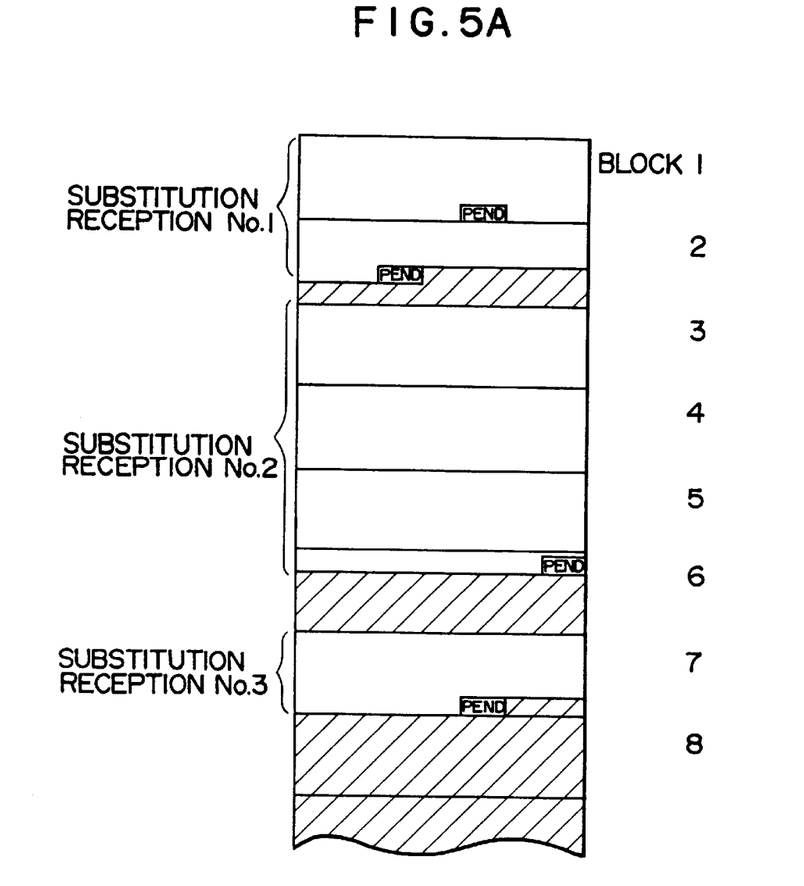
FIG. 5A is a view showing another management method of the image memory.

In the above embodiment, since the image memory 39 is continuously used, the table shown in FIG. 4B is used. However, if processing is to be simplified, the image memory 39 can be divided into a plurality of memory blocks having identical capacities, a shown in FIG. 5A, and these memory blocks may be managed in units of blocks. As shown in FIG. 5A, in a single substitution reception operation, data storage is started from the beginning of one block, and is performed not only in one block but over a plurality of blocks. At the end of a page, an end code PEND is stored as described above.

Figure 5B:
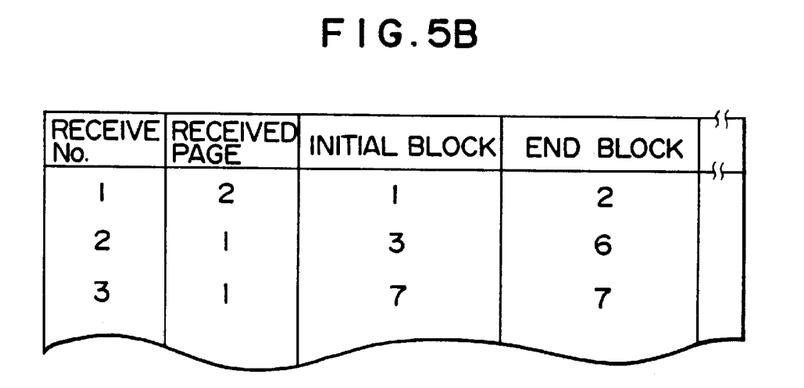
FIG. 5B is a view showing a management table according to the storage method shown in FIG. 5A.

When the storage method shown in FIG. 5A is employed, data storage addresses of substitution reception can be managed using a table shown in FIG. 5B. As shown in FIG. 5B, the table consists of data of a reception number, a page count, and storage initial and end block numbers. With this arrangement, memory management of the image memory 39 can be achieved by simpler processing.

According to the embodiment described above, when an abnormality, e.g., an absence of record paper, occurs, the control can immediately enter substitution reception for storing received data in an image memory. The image data is stored in the image memory from the beginning of the reception operation regardless of when the control enters the substitution reception processing. Therefore, the data stored in the image memory can be recorded, so that image data free from any loss by cutting of the record paper or the like can be reproduced.

Note that the present invention is not limited to the above embodiment, and various other changes and modifications may be made within the spirit and scope of the invention.

What is claimed is:

1. An image communication apparatus comprising:

means for receiving image data;

storage means for storing the received image data;

record means for recording the received image data; and control means for causing said storage means to store a portion of the received image data and causing said record means to record the same portion of the received image data in parallel, and for, when recording by said record means is disabled during reception of image data, causing said storage means to continue storage of received image data, said control means further, when recording by said record means is disabled at a start of reception of image data, causing said storage means to initiate storage of received image data.

2. An apparatus according to claim 1, wherein a recording disenabled state of said record means corresponds to a case wherein a remaining amount of record paper becomes smaller than a predetermined amount or a case wherein a jam of the record paper occurs.

3. An apparatus according to claim 1, wherein said record means records a received image on elongated record paper.

4. An apparatus according to claim 1, wherein said record means records an image in units of lines.

5. An apparatus according to claim 1, wherein said control means has a management table for managing data storage of said storage means, and manages storage of image data which is not recorded, in accordance with the management table.

6. An apparatus according to claim 1, wherein when recording is disenabled during reception of the image data, said control means holds the image data in said storage means as memory substitution reception data, and when image data stored in said storage means is recorded, causes said record means to record all the image data.

7. An image communication apparatus comprising:

means for receiving image data;

storage means for storing the received image data, said storage means storing compressed image data;

control means for causing said storage means to store a portion of the received image data and causing said record means to record the same portion of the received image data in parallel, and for, when recording by said record means is disabled during reception of image data, causing said storage means to continue storage of received image data to thereby hold the image data in said storage means as memory substitution reception data, said control means further, when recording by said record means is disabled at a start of reception of image data, causing said storage means to initiate storage of received image data.

8. An apparatus according to claim 7, wherein a recording disenabled state of said record means corresponds to a case wherein a remaining amount of record paper becomes smaller than a predetermined amount or a case wherein a jam of the record paper occurs.

9. An apparatus according to claim 7, wherein said record means records a received image on elongated record paper.

10. An apparatus according to claim 7, wherein said record means records an image in units of lines.

11. An apparatus according to claim 7, wherein said control means has a management table for managing data storage of said storage means, and manages storage of image data which is not recorded, in accordance with the management table.

12. An image communication apparatus for recording images while receiving image data, comprising:

means for receiving image data via a subscriber line;

storage means for storing the received image data;

record means for recording the received image data; and control means for causing said storage means to store the received image data in order from a first page so that said storage means keeps in storage all of received image data of at least one page, the one page including data that has already been subjected to a normal recording by said record means, in a case that recording by said record means is disabled during reception of the image data of a page next following the one page.

13. An image communication apparatus according to claim 12, wherein said control means causes said storage means to store the received image data and causes said record means to record the same received image data in parallel.

14. An image communication apparatus according to claim 13, wherein said storage means stores encoded image data.

15. An image communication apparatus according to claim 12, wherein said image communication apparatus is facsimile apparatus.

16. An image communication method comprising the steps of:

receiving image data;

storing the received image data in storage means;

recording the received image data; and controlling said storing and recording steps to store a portion of the received image data in the storage means and to record the same portion of the received image data in parallel, and, when recording is disabled during reception of image data, to continue storage of received image data in the storage means, said controlling step further, when recording is disabled at a start of reception of image data, initiating storage of received image data in the storage means.

17. A method according to claim 16, wherein a recording disenabled state in said recording step corresponds to a case wherein a remaining amount of record paper becomes smaller than a predetermined amount or a case wherein a jam of the record paper occurs.

18. A method according to claim 16, wherein said recording step records a received image on elongated record paper.

19. A method according to claim 16, wherein said recording step records an image in units of lines.

20. A method according to claim 16, wherein said controlling step uses a management table for managing data storage in the storage means, and manages storage of image data which is not recorded, in accordance with the management table.

21. A method according to claim 16, wherein when recording is disenabled during reception of the image data, said controlling step holds the image data in the storage means as memory substitution reception data, and when image data stored in the storage means is recorded, causes said recording step to record all the image data.

22. An image communication method comprising the steps of:

receiving image data;

storing the received image data in storage means, said storing step storing compressed image data;

recording the received image data; and controlling said storing and recording steps to store a portion of the received image data in the storage means and to record the same portion of the received image data in parallel, and for, when recording is disabled during reception of image data, to continue storage of received image data in the storage means to thereby hold the image data in the storage means as memory substitution reception data, said controlling step further, when recording is disabled at a start of reception of image data, initiating storage of received image data in the storage means.

23. A method according to claim 22, wherein a recording disenabled state corresponds to a case wherein a remaining amount of record paper becomes smaller than a predetermined amount or a case wherein a jam of the record paper occurs.

24. A method according to claim 23, wherein said controlling step uses a management table for managing data storage in the storage means, and manages storage of image data which is not recorded, in accordance with the management table.

25. A method according to claim 22, wherein said recording step records a received image on elongated record paper.

26. A method according to claim 22, wherein said recording step records an image in units of lines.

27. An image communication method for recording images while receiving image data, comprising the steps of:

receiving image data via a subscriber line;

storing the received image data in storage means;

recording the received image data; and controlling said storing and recording steps to store the received image data in the storage means in order from a first page so that the storage means keeps in storage all of received image data of at least one page, the one page including data that has been already subjected to a normal recording in said recording step, in a case that recording by said recording step is disabled during reception of the image data of a page next following the one page.

28. An image communication method according to claim 27, wherein said controlling step stores the received image data in the storage means and causes said recording step to record the same received image data in parallel.

29. An image communication method according to claim 28, wherein said storing step stores encoded image data.

30. An image communication method according to claim 27, wherein said image communication method is operative in a facsimile apparatus.

* * * * *